United States Patent Office 3,736,334
Patented May 29, 1973

3,736,334
ANTI-CHOLESTEROL PHENOXYACETIC ACID ESTERS
Werner Winter, Viernheim, Hesse, Max Thiel, Mannheim, Kurt Stach, Mannheim-Waldhof, Felix Helmut Schmidt, Mannheim-Seckenheim, and Harald Stork, Lampertheim, Hesse, Germany, assignors to Boehringer Mannheim GmbH, Mannheim, Germany
No Drawing. Filed Jan. 19, 1971, Ser. No. 107,822
Claims priority, application Germany, Jan. 23, 1970, P 20 02 941.8
Int. Cl. C07d 7/42
U.S. Cl. 260—335          2 Claims

ABSTRACT OF THE DISCLOSURE

Phenoxyacetic acid esters of the formula

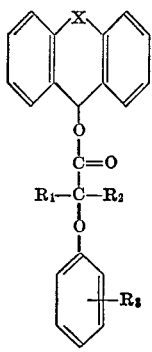

wherein

X is a valency bond, a sulfur or oxygen atom, a saturated or unsaturated alkylene radical or an oxamethylene or thiamethylene radical, $R_1$ and $R_2$, which may be the same or different, are hydrogen atoms or methyl radicals, and $R_3$ is a hydrogen or halogen atom, which compounds serve to reduce the cholesterol level in blood. The process of making and using the compounds are also covered.

---

The present invention is concerned with new phenoxyacetic acid esters and with the preparation thereof, as well as with pharmaceutical compositions containing the new esters and their use in pharmaceutical applications.

The new phenoxyacetic acid esters according to the present invention are compounds of the general formula:

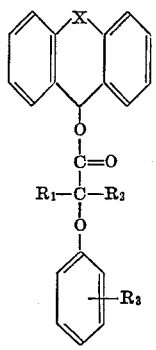

wherein

X is a valency bond, a sulfur or oxygen atom, a saturated or unsaturated alkylene radical or an oxamethylene or thiamethylene radical, $R_1$ and $R_2$, which may be the same or different, are hydrogen atoms or methyl radicals, and $R_3$ is a hydrogen or halogen atom.

We have found that the new compounds according to the present invention have a strong chloesterol-lowering action. Consequently, the new compounds are effective for the treatment of atheroscleroses.

The new compounds according to the present invention can be prepared, for example, by reacting carbinols of the general formula:

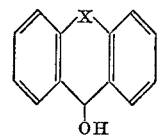

in which X has the same meaning as above, or reactive derivatives thereof, with carboxylic acids of the general formula:

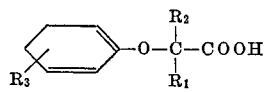

in which $R_1$, $R_2$ and $R_3$ have the same meanings as above, or with reactive derivatives thereof.

As reactive derivatives of the carbinols (II), there can be used, for example, the alcoholates and the esters with anions which are readily split off, for example, the halides, sulfonic acid esters and the like.

As reactive derivatives of the carboxylic acids (III), there can be used the esters with low boiling point alcohols, acid anhydrides, acid chlorides and also the salts thereof.

The condensation of the carbinols (II) with the acid derivatives (III) preferably takes place at an elevated temperature in inert solvents, for example, benzene, chloroform, high boiling point ethers or the like. For increasing the yields, the by-products formed (water, alcohol, acid) are preferably continuously removed from the reaction medium. When, as active acid derivative (III), an acid chloride or anhydride is used, it is advantageous to remove the liberated acid by the addition of a base such as pyridine or triethylamine.

When the free acid (III) is used, then it is advantageous to add reagents promoting the splitting off of water, such as dicyclohexyl carbodiimide or a strong mineral acid, in order to increase the yield.

When, as reactive acid derivative (III), there is used an ester, then the desired reaction products (I) are formed by transesterification with the carbinols (II). In order to increase the reaction velocity, strong acids or bases can be added in catalytic amounts.

The reaction of the ester (II) with the salts of the acids (III) takes place in polar solvents, for example, dimethyl formamide or dioxan, in which the starting materials are partially soluble, preferably at an elevated temperature. As salts, it is preferred to use the readily prepared alkali metal or tertiary ammonium salts. When using halides derived from carbinols of General Formula II, especially good yields are obtained when using silver salts of the acids (III).

According to the present invention, there are also provided pharmaceutical compositions containing at least one of the Compounds I, in admixture with a solid or liquid pharmaceutical diluent or carrier.

The following examples are given for the purpose of illustrating the present invention:

EXAMPLE 1

5-(4-chlorophenoxy-isobutyroxy)-10,11-dihydro-5H-dibenzo[a,d]cycloheptene 10.8 g. (0.052 mole) 5-hydroxy-10,11-dihydro-5H-dibenzo[a,d]cycloheptene in 100 ml. benzene are mixed with 4.85 ml. (0.06 mole) pyridine. 12.0 g. (0.052 mole) p-chlorophenoxy-isobutyryl chloride, dissolved in 20 ml. benzene, are subsequently added dropwise to this solution. The reaction mixture is then heated under reflux for 6 hours and, after cooling, the precipitate obtained is filtered off with suction. The filtrate is evaporated and the residue taken up in ether. The organic phase is then dried over anhydrous sodium sulfate, evaporated in a vacuum and the evaporation residue distilled under oil pump vacuum. 5-(4-chlorophenoxy-isobutyroxy)-10,11-dihydro-5H-dibenzo[a,d]cycloheptene (Compound 1) is obtained as a fraction boiling at 190–200° C./0.05 mm. Hg. The yield is 14.7 g. (70.4% of theory) and the compound has a melting point of 93–94° C.

EXAMPLE 2

11-[2-(4-chlorophenoxy)-propionyloxy]-6,11-dihydro-dibenzo[a,d]-thiepine

In a manner analogous to that described in Example 1, 6.9 g. (0.03 mole) 11-hydroxy-6,11-dihydro-dibenzo[b,e]thiepine are reacted with 9.4 g. (0.043 mole) 2-(4-chlorophenoxy)-propionyl chloride in the presence of 5.7 ml. (0.067 mole) pyridine in 130 ml. benzene. The reaction mixture is stirred for 2 hours at ambient temperature, the precipitate formed is filtered off with suction and the filtrate is evaporated to dryness in a vacuum. The evaporation residue is triturated with a little ligroin, filtered with suction and subsequently recrystallized from cyclohexane. There are obtained 9.6 g. (78% of theory) 11-[2 - (4 - chlorophenoxy)-propionyloxy]-6,11-dihydro-dibenzo[b,e]-thiepine (Compound 2), which has a melting point of 105° C.

Further compounds prepared in a manner analogous to that described in Example 1 or 2 are summarized in the following table:

TABLE 1

| Compound | B.P. | M.P., °C. | Yield, percent |
|---|---|---|---|
| 3 — 11-(4-chlorophenoxy-isobutyroxy)-6,11-dihydro-dibenzo[b,e]oxepine. | 210–218° C./0.3 mm. Hg. | 80 | 55 |
| 4 — 5-(4-chlorophenoxy-isobutyroxy)-5H-dibenzo-[a,d]cycloheptene. | 240–246° C./0.3 mm. Hg. | 120 | 63 |
| 5 — 9-(4-chlorophenoxy-isobutyroxy)-fluorene. | 245–250° C./0.4 mm. Hg. | 70 | 61 |
| 6 — 11-(4-chlorophenoxy-isobutyroxy)-6,11-dihydro-dibenzo[b,e]thiepine. | | 75 | 68 |
| 7 — 9-(4-chlorogpenoxy-isobutyroxy)-xanthene. | | 84 | 59 |
| 8 — 11-[2-(4-chlorophenoxy)-propionyloxy]-6,11-dihydro-dibenzo[b,e]oxepine. | 205–215° C./0.2 mm. Hg. | 88 | 65.7 |
| 9 — 5-[2-(4-chlorophenoxy)-propionyloxy]-5H-dibenzo[a,d]cycloheptene. | 229–240° C./0.2 mm. Hg. | 127 | 63 |
| 10 — 5-[2-(4-chlorophenoxy)-propionyloxy]-10,11-dihydro-5H-dibenzo[a,d]cycloheptene. | 195–205° C./0.2 mm. Hg. | 102 | 77 |
| 11 — 9-[2-(4-chlorophenoxy)-propionyloxy]-fluorene. | 192–196° C./0.05 mm. Hg. | 105 | 81.5 |
| 12 — 11-(4-chlorophenoxy-acetoxy)-6,11-dihydro-dibenzo[b,e]oxepine. | | 123 | 80 |
| 13 — 5-(4-chlorophenoxy-acetoxy)-5H-dibenzo[a,d]cycloheptene. | | 142 | 79.2 |
| 14 — 5-(4-chlorophenoxy-acetoxy)-10,11-dihydro-5H-dibenzo[a,d]cycloheptene. | | 131 | |
| 15 — 11-(4-chlorophenoxy-acetoxy)-6,11-dihydro-dibenzo[b,e]-thiepine. | | a 80.6 | |
| 16 — 9-(4-chlorophenoxy-acetoxy)-fluorene. | | 121 | 85 |
| 17 — 5-(phenoxy-isobutyroxy)-10,11-dihydro-5H-dibenzo-[a,d]cycloheptene. | 182–190° C./0.2 mm. Hg. | 88 | 71.2 | a Amorphous.

The anti-hyperlipidemic activity of the novel compounds was demonstrated as follows, the numerals having reference to the compounds of Table 1:

Male rabbits weighing approximately 4 kgs. were intravenously administered 200 mg./kg. of octylphenol polyethyleneglycol ether (sold under the trade name Triton WR 1339) in neutral solution to induce a hyperlipidemia. The control animals were given only the octylphenol polyethyleneglycol ether, whereas the other animals were also administered the substance to be tested at a dosage of 2× 20 mg./kg. per day orally (p.o.) by means of a stomach tube. For reasons of comparison, 2-(p-chlorophenoxy)-2-methyl-propionic acid ethyl ester (sold under the trade names Clofibrat and Regelan) and known to reduce blood cholesterol level was also administered orally (p.o.) at a dosage of 2× 20 mg./kg. During the test the animals were given food and water ad libitum. Following the 4th test day venous blood was taken from the animals and in the serum received therefrom triglycerides were determined enzymatically and cholesterol colorimetrically. The results of these tests and the percentage decreases calculated therefrom were as shown in the following Table 2.

TABLE 2

| Compound administered | Triglycerides | | | Cholesterol | | |
|---|---|---|---|---|---|---|
| | Control group | Tested group | Reduction in percent | Control group | Tested group | Reduction in percent |
| 2-(p-chlorophenoxy)-2-methyl-propionic acid ethyl ester | 887 | 795 | −14 | 431 | 371 | −10 |
| 1 | 864 | 598 | −31 | 489 | 296 | −29 |
| 3 | | | | 284 | 254 | −11 |
| 5 | | | | 284 | 228 | −20 |
| 6 | | | | 464 | 409 | −12 |
| 7 | 975 | 333 | −48 | 376 | 223 | −30 |
| 10 | | | | 522 | 398 | −22 |
| 14 | | | | 464 | 394 | −15 |

The novel compounds may be administered by themselves or in conjunction with carriers which are pharmacologically acceptable, either active or inert. The dosage units are similar to those of the heretofore known anti-cholesterol agents, e.g. about 1 to 2 grams per day for an adult or about 30 mg./kg. per day although higher or lower dosages can be used. Rather than a single dose it is preferable if the compounds are administered in the course of a day, i.e. about four applications of 500 mg. each at spaced time intervals or 8 of about 250 mg. each. A convenient form of administration is in a gelatin capsule.

It will be appreciated that the instant specification and examples are set forth by way of illustration and not limitation, and that various modifications and changes may be made without departing from the spirit and scope of the present invention.

What is claimed is:

1. Compound of the general formula

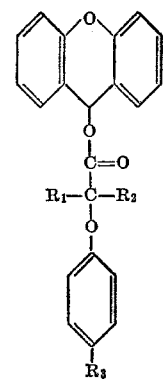

wherein

R₁ and R₂ which may be the same or different, are hydrogen atoms or methyl radicals, and R₃ is a hydrogen or chlorine atom.

2. Compound according to claim 1, wherein such compound is 9-(4-chlorophenoxy-isobutyroxy)-xanthene.

References Cited

M. R. Walsh et al., Arch. Biochem. & Biophysics, vol. 130 (1969), pp. 7–18.

NORMA S. MILESTONE, Primary Examiner

U.S. Cl. X.R.

424—275, 278, 283, 308; 260—327 B, 333, 328